Sept. 12, 1950 J. E. LILIENFELD 2,521,734
MOTION-PICTURE APPARATUS AND MEANS COACTING THEREWITH
FOR PROVIDING FILM STRIP WITH REFERENCE INDICIA
Filed May 9, 1946
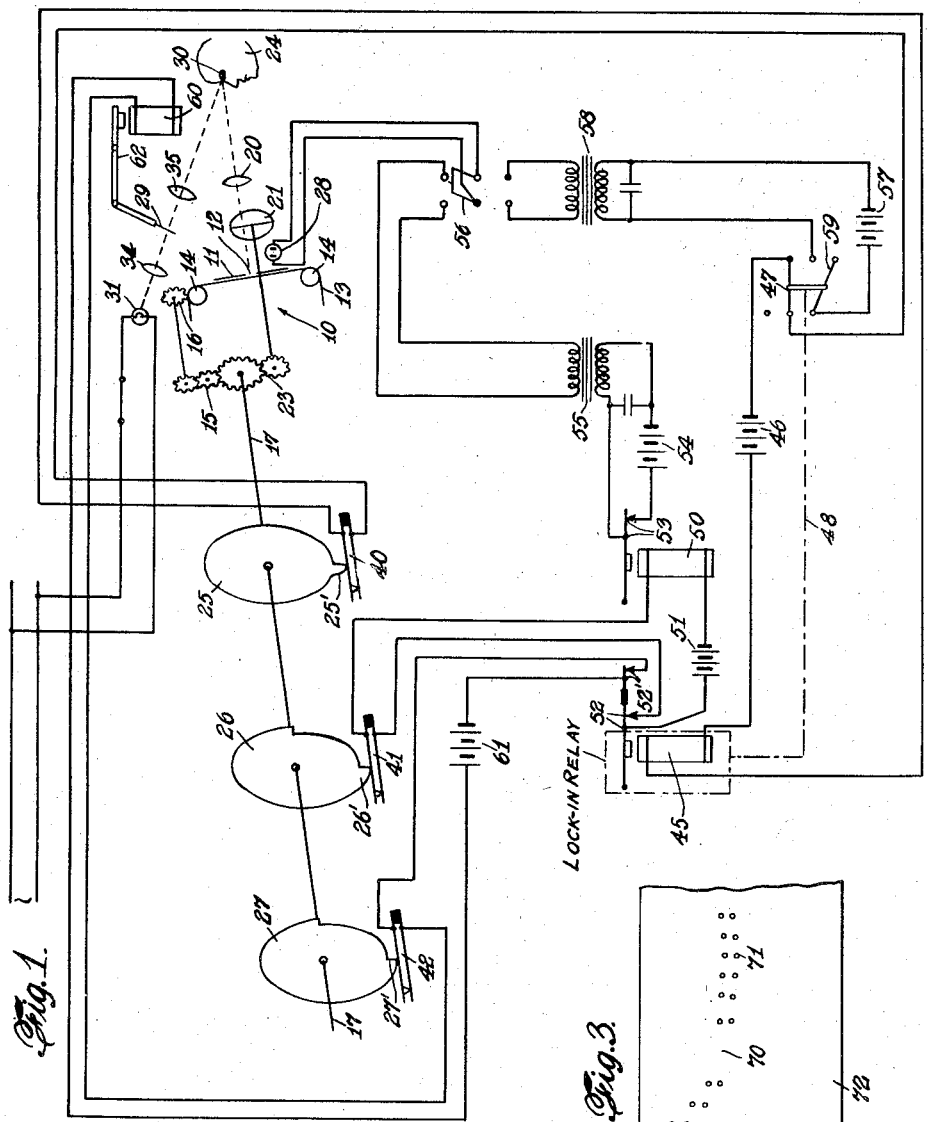
INVENTOR
Julius Edgar Lilienfeld
BY
Fred'k H. Schuetz
ATTORNEY.

Patented Sept. 12, 1950

2,521,734

UNITED STATES PATENT OFFICE 2,521,734

MOTION-PICTURE APPARATUS AND MEANS COACTING THEREWITH FOR PROVIDING FILM STRIP WITH REFERENCE INDICIA

Julius Edgar Lilienfeld, St. Thomas, V. I.

Application May 9, 1946, Serial No. 668,520

1 Claim. (Cl. 88—16)

The invention relates to motion picture camera apparatus and to a novel film strip resulting from the use of the same. In my copending application for U. S. Letters Patent, Serial No. 635,797, filed December 18, 1945, which has eventuated in Patent No. 2,445,787 issued July 27, 1948, I have disclosed apparatus for providing from an ordered set of quantities, represented in a manner unrelated to a desired frame of reference, a coordinate plot referred to such a frame. This original set of unrelated quantities, for example, may be obtained from a plurality of successive and varying photographic recordings, as provided by a film strip, successive frames of which have been exposed in passing through a motion picture camera. Thus, as a specific example, a film strip is prepared with frames showing various dilations and contractions of the pupils of a patient's eyes and resulting from the application of stimuli to the patient.

In such pupillographic observations it is desirable to have some indication, on the pupillogram obtained, whereby the time of application of the stimulus with reference to its different effects on the patient may be readily associated and read with the plot. In the preparation of the plot, an optical scanning of the images projected from successive frames of the photographic record is involved.

The present invention has for an object to provide an exposed film strip which will afford a frame or frames of which the projected image would be sufficiently free of discontinuities as to exclude effective scanning action, so that a characteristic interruption produced thereby in the continuity of the plot may serve as an indication of the time of application of a stimulus.

Another object of the invention is to provide distinctive frames, interspersed among groups of the indicia-bearing frames, the former frames being so located as to correspond to the initiation of a stimulus and/or a termination thereof.

Still another object of the invention is to provide a light source which is so associated with the photographic camera in the making of the film strip as to be energized at predetermined times for the purpose of providing an indicating frame.

A further object of the invention is to provide a light source of this nature which shall have an extremely short period of flash, say of the order of 1/1000 of a second.

The invention has for an object, also, to provide means for synchronizing the application of a stimulus with the energization of the light source for providing a frame or frames.

In carrying out the invention, there is to be associated with the motion picture camera, used to photograph the pupillary dilations and contractions of a patient, a source of light such as an electric incandescent lamp or, in the case of exact synchronism between the said source energization and the stimulus effecting means, a gaseous discharge lamp. Provision is made to energize said source of light, preferably automatically at the beginning and/or termination of the application of the stimulation effect upon a patient, the source of light being so located with respect to the travel of a sensitized strip of film passing through the camera that an area of substantially an entire frame, or of several frames, thereof may be flooded with light to afford an image scanning area along the film strip which shall be substantially free of discontinuities and thus provide on the final plot an indication characteristically different from the quantity recordings.

The nature of the invention, however, will best be understood when described in connection with the accompanying drawings, in which:

Fig. 1 is a diagrammatic view illustrating the circuits and apparatus used in the preparation of the imprinted strip film.

Fig. 2 is a plan view of a section of film strip provided with imprinted timing indications.

Fig. 3 is a plot or pupillogram showing several timing indications.

Referring to the drawings, more particularly Fig. 1 thereof, 10 designates diagrammatically a motion picture camera embodying generally the usual gate or like element 11 having the aperture 12. A film strip 13 is caused to be advanced intermittently before this aperture and through said gate element in the usual manner, for example, by means of sprockets 14. These are driven, through intermediate speed-changing mechanisms 15, 16 including also intermittent motion devices (not shown), from a rotating shaft represented by the line 17. The advance of the film strip is synchronized, through the interconnected mechanism, with the rotation of a plurality of cams or switch operating members mounted for rotation on the said rotating shaft 17. In the present embodiment, three such cam elements are indicated, but this number may be varied in accordance with the desired number of operations to be performed synchronously with the photography of desired quantities.

An optical system, comprising a lens system indicated at 20 and a shutter 21, is associated with the aforesaid film advancing mechanism to photograph on said film strip 13 the desired matter such as successive prints 13' of the pupils of a pair of eyes. The shutter is interconnected, through intermediate mechanism 23, with the rotating shaft 17 and is suitably timed to the positioning of a frame of the film strip—all of which is well understood in the art and for which no claim is made herein.

However, on the shaft 17 there are mounted to rotate therewith cams for controlling at recurring intervals certain conditions which affect not only a patient, represented at 24, but also the sensitized film strip 13 in its travel through the gate. For example, a cam 25, which is the master cam of the group, controls the effects produced through the action of the two further cams 26 and 27, the former controlling a circuit for flashing a lamp 28 which is, preferably, of the gaseous discharge type, and the latter controlling a circuit for effecting the movement of a shutter element 29, in and out of the intersection of light rays of a second optical system, for the purpose hereinafter more fully set forth.

The camera 10 is operated in the usual manner by imparting rotation to the shaft 17 by suitable means (not shown) to photograph on the film 13 the desired quantities of which a graph referred to a desired frame of reference is to be subsequently provided in the manner set forth in my said co-pending application. In the embodiment illustrated, the object photographed is the eye or eyes 30 of the patient 24, more especially the dilations and contractions of its pupil under the application of stimuli. Such stimulus may be of an optical or acoustical or other nature; and, when of an optical nature, may be applied, for example, by subjecting the eye periodically to a controlled source of light 31 directed through a lens system to the eye 30, but which is normally interrupted by means such as the shutter 29. The latter is, to this end, interposed in the path of the light rays and preferably substantially at the intersection of light rays passing through the optical system which comprises a condenser lens 34 and a collimating lens 35, so that a small movement of the shutter may be caused to permit the light rays to pass or to be intercepted.

Simultaneously with the application of such stimulus, lamp 28 is flashed, said lamp being so located between the gate 11 and the shutter 21 that the particular frame of the film strip at that moment in position before the aperture will be flashed with light and thus afford an area substantially without discontinuities present in the groups of frames normally exposed at other times, it being understood that shutter 21 will be so synchronized with the energization of said lamp 28 as to intercept light rays which might otherwise influence the pupil variations produced as a result of the applied stimulus from lamp 31. Provision is made, also, to flash lamp 28 under manual control, rather than automatically, as will hereinafter be set forth, in the event of some particular incident occurring and the time of which it is desired to record on the film strip.

The initial timing of various automatic actions is under the control of cam 25 through its dwell portion or tooth 25' in closing or opening a switch 40 associated with the cam. Similarly, a dwell portion 26' of cam 26 and a dwell portion 27' of cam 27 operates switches 41 and 42 associated respectively with said cams 26 and 27.

In controlling the action of the two cams 26 and 27, cam 25 through its switch 40 is designed to close a circuit of a lock-in relay 45 which circuit includes the battery 46, or other source of power, and a manually operated switch 47. So long as switch 47 remains closed, relay 45 will be energized each time the tooth 25' contacts switch 40, but will not be released from the locked-in position until switch 47 is opened. This release may be accomplished by a mechanical connection between the switch 47 and the lock-in means 45, as indicated by the broken line 48. Energization of relay 45 effects the energization of the further relay circuit and relay 50 including a battery 51 and contacts 52 of relay 45, but only when the dwell portion 26' of cam 26 contacts switch 41 which is included in series in the relay circuit for relay 50.

The operation of said relay 50, in turn, effects through contacts 53 the closing of the primary circuit, including battery 54, of an induction or Ruhmkorff coil 55. The output of the latter is adapted for connection to lamp 28 through the double-throw double-pole switch 56, the lamp being flashed each time the cam 26 closes its switch 41, and also when it opens the same. However, the flashing of lamp 28 may be controlled manually, as in throwing over the double-throw double-pole switch 56 to a further power circuit including a battery 57, induction coil 58 and a switch 59, the latter being interlocked with the switch 47 of the circuit of relay 45 so that all action by cam 25 and the cams 26, 27 is excluded when switch 59 closes the power circuit to coil 58.

To introduce a stimulus or other effect, use is made of the cam 27 to energize a further circuit and relay 60, it being understood that the manual control of lamp 28 has been discontinued and the double-throw double-pole switch 56 restored to the position for receiving energy from the coil 55. There is included in the circuit of relay 60 a battery 61 and the switch 42 of cam 27; and when the circuit is completed at said switch, the armature 62 of the relay will be attracted and will cause the light-weight shutter 29 to be moved out of the path of the light rays of the optical system which includes lamp 31 and the lenses 34 and 35, said system being directed toward the eye 30 of the patient 24, as hereinbefore set forth. Light from lamp 31 will thus be directed (so long as switch 42 remains closed) and in synchronism with the flashing of the lamp 28 which produces the flooding of a frame or frames of the film strip to provide an area thereon which will afford subsequently a characteristic indication 70, Fig. 3 (extended blank space between groups 71 of the pupillogram 72 obtained from the film strip).

While, for the sake of clearness, the drawings show the system as designed for stimulation of but one eye of the patient, it will be understood, of course, that provision may be made for effecting the stimulation of either eye of the patient merely by providing an additional optical system, similar to the one herein described and shown in the drawings, which system would be operated by being introduced, alternatively with the described optical system, into the circuit under control of the cam 27 and its associated switch 42.

In the practical operation of the apparatus, it has been found desirable to apply the light stimuli in cycles, generally, of a period of 3 seconds light on and 1 second light off; or the reverse. The cams 25, 26 and 27 to this end are caused to make one complete revolution each 4 seconds; and the number of pictures photographed each cycle or complete revolution would be 100 at the rate of 25 per second; or, at the rate of 15 per second, 60 pictures—all as is more fully disclosed in article entitled: Pupillographic Studies, Present State of Pupillography; Its Method and Diagnostic Significance. By Otto Lowenstein, M. D., and E. D. Friedman, M. D.—reprint from the Archives of Ophthalmology, May 1942, vol. 27, pp. 969–993.

I claim:

The combination with a single motion picture camera for photographing matter successively and comprising a gate member through which an unexposed film strip is adapted to pass, film advancing means to feed the film intermittently through the gate member, and a shutter for exposing successive frames of the film strip in the gate to matter to be photographed to provide thereof a succession of photographs on said strip; of a source of light located between the shutter and the gate to flood with light the area of substantially an entire frame of an unexposed film portion in the gate, together with means to flash momentarily said source of light; a second source of light, together with an optical system adapted to direct a beam of light to the matter to be photographed, the latter being located in the field of the motion picture camera; a shutter associated with said optical system to intercept the said beam of light; and means operative synchronously with the energization of said first-named source of light to thereafter displace for a cycle of the film advance the said second-named shutter out of the path of the directed beam.

JULIUS EDGAR LILIENFELD.

REFERENCES CITED

The following references are of record in the file of this patent:

UNITED STATES PATENTS

| Number | Name | Date |
|---|---|---|
| 1,489,794 | Stalling | Apr. 8, 1924 |
| 1,654,926 | Engel | Jan. 3, 1928 |
| 1,669,427 | Smith | May 15, 1928 |
| 1,895,644 | Regan et al. | Jan. 31, 1933 |
| 1,946,323 | Kucharski | Feb. 6, 1934 |
| 2,282,957 | Fields | May 12, 1942 |
| 2,339,780 | Huitt | Jan. 25, 1944 |
| 2,353,154 | Fowler | July 11, 1944 |
| 2,393,316 | Edgerton | Jan. 22, 1946 |